Jan. 10, 1956   J. H. COHEN ET AL   2,730,666
POWER CONTROL DEVICE FOR ELECTRIC MOTOR
Filed March 23, 1953
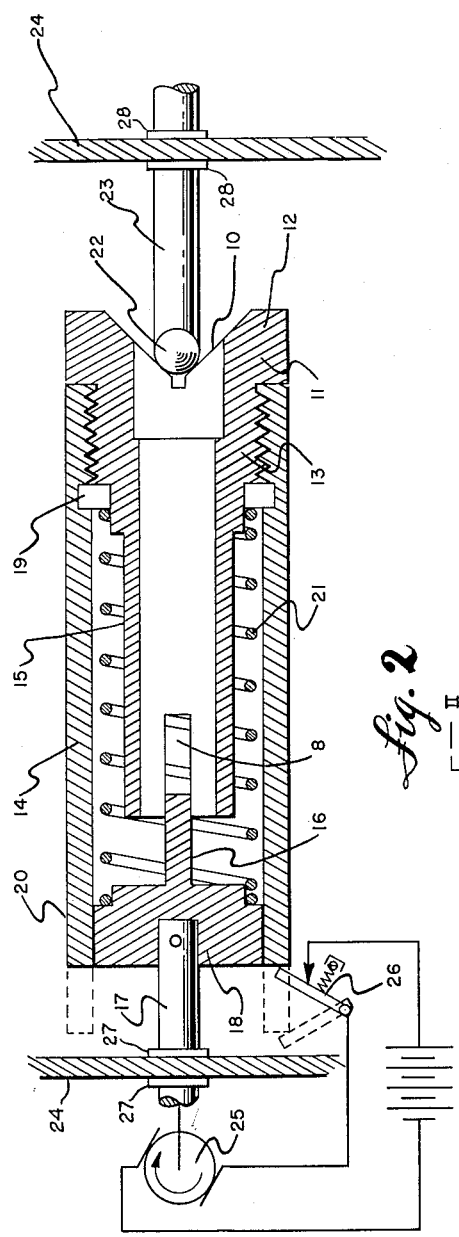
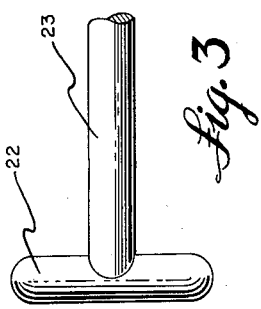
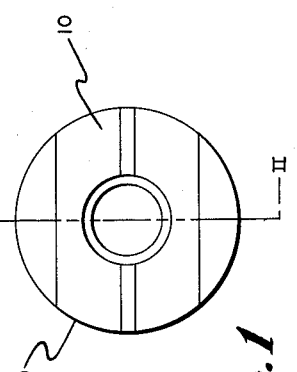
Jack H. Cohen
R.A. Goslin
*INVENTORS*
BY *G. D. O'Brien*
*T. L. Styner*

United States Patent Office 2,730,666
Patented Jan. 10, 1956

2,730,666

POWER CONTROL DEVICE FOR ELECTRIC MOTOR

Jack H. Cohen and Robert A. Goslin, Indianapolis, Ind., assignors to the United States of America as represented by the Secretary of the Navy Application March 23, 1953, Serial No. 344,256

5 Claims. (Cl. 318—475)

(Granted under Title 35, U. S. Code (1952), sec. 266)

The invention described herein may be manufactured and used by or for the Government of the United States of America for governmental purposes without the payment of any royalties thereon or therefor.

This invention relates to a power control device which is actuated by an overload in the system to interrupt the power flow.

Old methods of accomplishing this purpose consist in providing a friction coupling in the power train. Such a coupling had the disadvantages that if the friction coefficient became too large there was danger of stripping gears or otherwise damaging the driven parts of the system. Another disadvantage of the old system, in which a rubber hose was used to provide the friction coupling, was that the rubber was subject to oxidation and breakage under strain.

The present invention provides a coupling which is not dependent upon friction and has no rubber hose connection. Instead of relying upon friction the present invention provides an overload clutch in which the power transmitted is determined by the compression strength of a resilient member. The present invention is further characterized in that the overload clutch operates to control the power source.

The present invention has for its objects to provide a system for controlling a power train.

Another object of this invention is to provide a reliable clutch of simple design whose power transmission is substantially independent of the coefficient of friction involved.

Another object of this invention is to provide a coupling element which can be made to releasably yield to very small resistances.

Another object of the invention is to provide a coupling whose yielding torque can be adjusted at will.

Other objects and features of the invention will become apparent to those skilled in the art as the disclosure is made in the following detailed description of a preferred embodiment of the invention as illustrated in the accompanying sheet of drawings in which:

Fig. 1 shows an end view of the releasable clutch taken from the driving end of the clutch, Fig. 2 is a schematic view of the power circuit and the control circuit with a view of the clutch member taken on the line II—II of Fig. 1, and Fig. 3 shows the cam follower of the clutch member.

Referring now to the drawings, wherein like reference characters designate like or corresponding parts throughout the several views, there is shown in Fig. 1 the end view of clutch member 9 having a cam groove 10. As shown in Fig. 2, the details of the clutch 9 comprise a sleeve member 20 which includes a tubular member 11 having a flange 12, a threaded portion 13, a reduced portion 15 with a shoulder 19 between the portion 13 and 15. Attached to the tubular member 11 is a second tubular member 14, one end of which threadedly engages the threaded portion of member 11. The reduced portion 15 of tubular member 11 extends in spaced relation to and is surrounded by member 14. Drive shaft 17 is journalled in frame 24, and shoulders 27 prevent axial displacement of the drive shaft with respect to the frame. The end of this member 15 is slotted at 8 to receive a tongue portion 16 of the driving shaft 17. The drive shaft carries a flange like collar 18 affixed thereto adjacent the tongue portion 16, which collar or flange 18 slidably engages the tubular member 14. Interposed between collar 18 and shoulder 19 of member 11 is a compression spring 21. The flange 12 has in its outer end the cam groove 10 which engages the cam follower 22 of the driven shaft 23. Driven shaft 23 is journalled in frame 24, and shoulders 28 prevent axial displacement of the driven shaft with respect to the frame. Shafts 17 and 23 are mounted in a frame 24 to prevent relative movement between them. Shaft 17 is driven from a power source represented schematically as a motor 25. Positioned adjacent to the end of the sleeve 14 is a switch 26 which may be of the toggle type and which is actuated by the movement of the sleeve 14 to interrupt the power circuit of the motor 25 when there is an overload on shaft 23. The loading required to actuate the clutch and power control is determined by selecting spring 21 to be of the required strength.

In operation, the clutch member 9 is actuated when the resistance of shaft 23 exceeds the pre-set limit of the clutch to release the power from shaft 23 and to open switch 26. This overload action results from the cam follower 22 operating against the cam groove 10 to force sleeves 11 and 14 to move relative to the shaft 17 thus allowing the cam follower to ride out of the groove. At the same time the relative movement of sleeve 14 and the switch actuates the toggle to interrupt the power supply of the motor 25, thus automatically removing any torque from shaft 23.

The above description is illustrative of a preferred embodiment of the invention, however, it is obvious that the relative movement of the clutch sleeve member 14 could be used to actuate other types of power control for interrupting the power flow from the source. Such means could obviously be either electrical or mechanical.

Obviously many modifications and variations of the present invention are possible in the light of the above teachings. It is to be understood that the invention may be practiced otherwise than as specifically described.

What is claimed is:

1. A power control mechanism comprising an input shaft, an output shaft, a collar attached adjacent one end of said input shaft, said input shaft having said one end reduced to a tongue, a first tubular member slidably surrounding said collar, a second tubular member threadedly attached at one end to the end of said first tubular member and extending partially within said first tubular member, said second tubular member having slots in the end extending within said first tubular member, and having a cam surfaced recess in its other end, said slots engaging said tongue of the input shaft, said output shaft having a cross member engaged in said recess, a compression spring retained between the collar and the threaded ends of the tubular members and surrounding a portion of said second tubular member.

2. A power control mechanism comprising an outer and inner sleeve connected at one end, an input shaft having a shoulder slidably engaged in said outer sleeve, a non-rotatable slidable connection between said input shaft and said inner sleeve, a spring surrounding a portion of said inner sleeve and said input shaft and held between said one end of sleeves and the shoulder on said input shaft, a cam surfaced recess in connected end of the sleeves, an output shaft, a cam follower on one end of said output shaft, said cam follower engaged in said cam surfaced recess to normally transmit power through said clutch, but operative when overloaded to be cammed out of said recess thus causing said sleeves to slide relative to said input shaft.

3. A power control mechanism comprising an input shaft, an output shaft, a collar attached adjacent one end of said input shaft, a tubular member having one end thereof slidably surrounding said collar, a cam member attached to the other end of said tubular member, a non-rotatable slidable connection between said input shaft and said cam member, said cam member having a cam surface on its end remote from said input shaft, said output shaft having a cam follower engaging said cam surface, resilient means retained between said collar and said cam member and maintaining said cam surface in engagement with said cam follower.

4. A power control mechanism comprising an input shaft, an output shaft, a collar attached adjacent one end of said input shaft, said input shaft having said one end reduced to a tongue, a first tubular member slidably surrounding said collar, a second tubular member threadedly attached at one end to the end of said first tubular member and extending partially within said first tubular member, said second tubular member having slots in the end extending within said first tubular member, and having a cam surface on its other end, said slots engaging said tongue of the input shaft, said output shaft having a cam follower engaged on said cam surface, a compression spring retained between the collar and the threaded ends of the tubular members and surrounding a portion of said second tubular member.

5. A power control mechanism comprising; a power means; a power cut-off means; and an overload clutch including an input shaft having one end connected to said power means, an output shaft, and a spring biased sleeve member comprised of a first tubular member having a cam notch at one end and slots at its other end, a second tubular member partially surrounding said first tubular member and threadably connected at one end to one end of said first tubular member, and a flange member having a tongue, said flange member being attached to said input shaft and slidable in said second tubular member against the bias of said spring with said tongue slidably engaging said slots, said output shaft having a portion engageable in said cam notch of said first tubular member, and said power cut-off means being actuated by the movement of said second tubular member relative to said flange member.

References Cited in the file of this patent
UNITED STATES PATENTS

| | | |
|---|---|---|
| 1,719,517 | Moore | July 2, 1929 |
| 1,938,720 | Preble | Dec. 12, 1933 |
| 1,996,849 | Bauer | Apr. 9, 1935 |
| 2,647,965 | Michie | Aug. 4, 1953 |